Aug. 21, 1934.    G. BOLOGNINI    1,970,541
PERMUTATION LOCK
Filed July 26, 1932    2 Sheets-Sheet 1

G. Bolognini
INVENTOR

By Marks & Clerk
Attys.

Aug. 21, 1934.  G. BOLOGNINI  1,970,541
PERMUTATION LOCK
Filed July 26, 1932  2 Sheets-Sheet 2
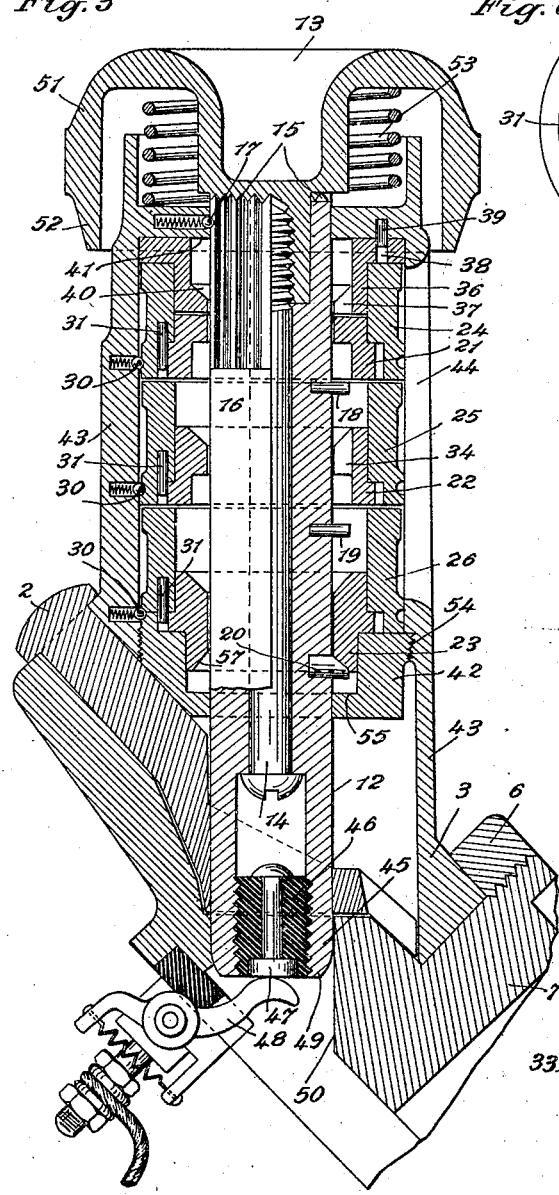
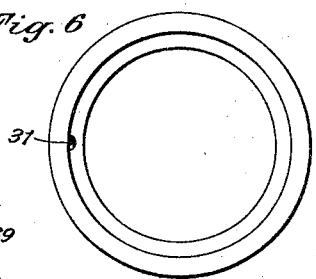
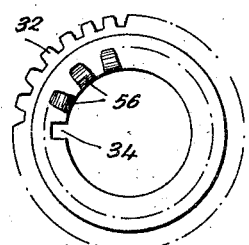
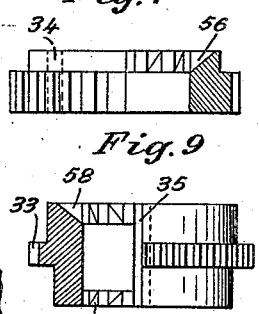
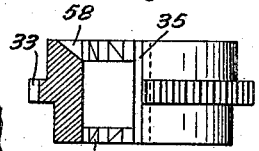
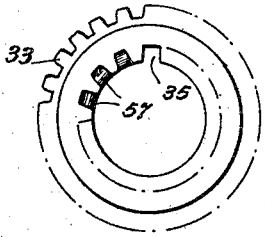
G. Bolognini
INVENTOR
By Marks & Clerk
ATTYS.

Patented Aug. 21, 1934

1,970,541

UNITED STATES PATENT OFFICE 1,970,541

PERMUTATION LOCK

Giovanni Bolognini, Bologna, Italy

Application July 26, 1932, Serial No. 624,871
In Italy June 14, 1932

1 Claim. (Cl. 70—53)

My present invention has for its object to provide a steering wheel and steering rod connecting and disconnecting device for motor cars comprising an opening and closing device for the starting and/or ignition circuits.

My said improved device has the following advantages:

(1) No key is needed for locking and unlocking the steering wheel when provided with the invention, thereby avoiding the trouble of keeping and the inconvenience of losing or mislaying same.

(2) Whilst any key is liable of being more or less easily imitated and used by strangers, and any lock is liable of being broken by easily obtainable means, my improved steering wheel can by no means be tampered with, because for operating same it would be necessary to form or compose a secret word only known to the owner.

A thief is incapable of guessing at a moment's notice among hundreds and thousands of combinations the right one for making the steering wheel operable, which latter cannot be done by force.

It is obvious that the owner or driver may at any time, by an easy operation, change the secret word of the lock concealed in my improved steering wheel, in case of the said secret word having been revealed to strangers casually or otherwise.

(3) When the steering wheel is left in its safety position, which means unlocked from the steering rod, the car cannot be driven nor trailed, but may be pushed on by hand or by slowly steering with the lock bearing part, or by steering the front wheels by hand. This is useful in case of the parked or garaged car having to be moved. It is obvious that this advantage is lacking in the cars with ordinary safety devices, many of which lock the change and steering gears.

(4) In certain cases the open precautionary measures taken by owners or drivers for locking and making thief-proof their cars, for instance in the garage of friends, may be offensive to the latter. There is nothing offensive in my improved safety device because except for interrupting the current for saving purposes, no visible precautions are taken, whilst nobody will be capable of tampering with the machine, the steering wheel being disconnected from the steering rod and thus loose on the same.

(5) By a single operation and without any key or tool the double effect of interrupting the current and making the steering wheel useless is obtained.

Figure 1:
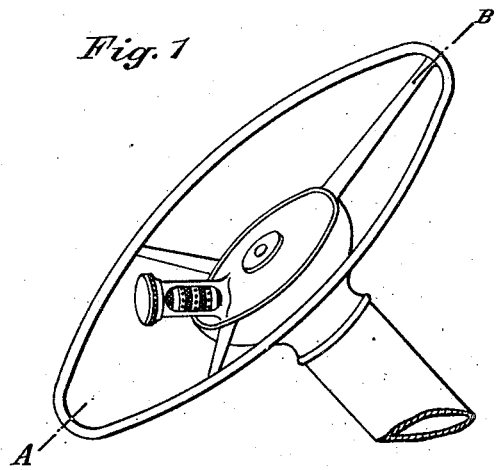
Figure 2:
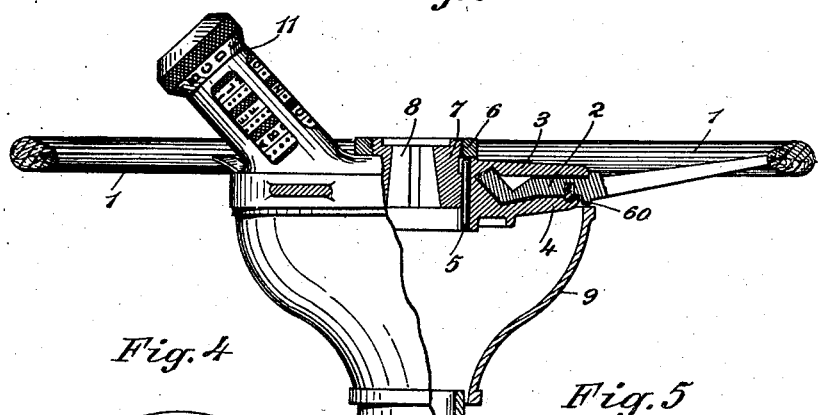
Figure 4:
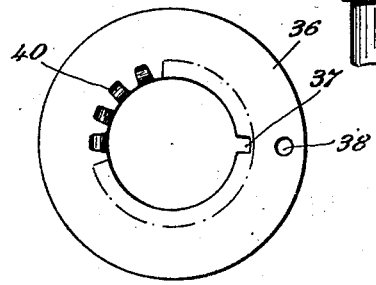

In order that my said invention may be better understood I am going to describe same with reference to the annexed drawings in which Fig. 1 is a perspective view of improved steering wheel according to invention, Fig. 2 a partial section on line A—B of Fig. 1, Fig. 3 a section on larger scale, of the main part of my improved safety device, whilst Figs. 4, 5, 6, 7, 8, 9 and 10 illustrate details.

The steering wheel 1 has a central disk 2 mounted between plates 3 and 4 which latter are made rigid in their rotary movement with regard to disk 2 by a pin or key 5 and connected by a ring 6 being screwed on to the central extension 7 of plate 4. The said extension 7 has a central bore so as to be capable of being applied to the upper end of the steering rod (not illustrated). Between disk 2 and plate 4 there is a spring-pressed ball or spherical stop 60 designed for determining the exact cooperating position between disk 2 and plates 3 and 4 which position may be indicated by an arrow on the outside.

A cup 9 mounted on the steering pillar 10 extends near disk 2 for preventing plates 3 and 4 being tampered with by tongs or other tools so as to fraudulently make them rigid with the steering wheel 1.

The object of my present invention is mainly to provide a device in which a secret or combination lock 11 is combined with plate 3, and disk 2 is combined with plate 4, the lock being designed for making these elements rigid between themselves and the steering wheel 1 rigid with the steering rod.

The said locking device 11 is shown in a sectional detail view in Fig. 3 and substantially comprises a pin or pivot 12 connected to the handle 13 by a screw 14. Pin 12 is capable of various angular positions with respect to handle 13 in each of which it is fixed by screw 14, the said angular positions being determined by teeth 15 formed both on handle 13 and corresponding end of pin 12. The latter will preferably have twenty-four teeth 15 corresponding to the twenty-four letters of the alphabet, and in front of each tooth 15 there will be grooves 16 in its outer face cooperating with spring-pressed stop ball 17 pushed by spring into the said grooves 16, so that in order to obtain rotation of handle 13 it is necessary to make ball 17 snap into each of grooves 16 in order to ascertain (by feeling or hearing) of how many letters pin 12 has been angularly shifted for the purpose indicated hereinafter.

Pin 12 is provided with three teeth 18, 19 and 20 each of which co-operates with toothed sleeves 21, 22, 23 respectively.

Each of the toothed sleeves is inserted into outer rings 24, 25, 26 respectively. The outer rings are substantially alike, see Figs. 5 and 6. As will be seen from Fig. 5, the ring has a milled crown 27, a letter crown with the alphabetic letters 28 and a crown with hemispherical recesses 29 adapted for cooperating with the elastic stop balls 30.

Figure 5:
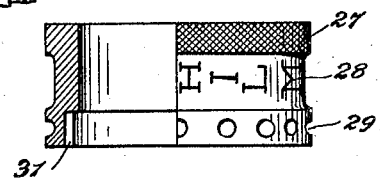

The ring shown in Fig. 5 has an inner tooth 31 cooperating with the outer teeth 32 or 33 of sleeves 21 and 22, or 23, respectively, Figs. 7, 8, 9, 10. The said tooth 31 permits of placing canal 34 or respectively 35 of rings 21, 22 or 23 in front of any letter engraved in crown 28 of rings (24, 25 or 26).

The above named members are mounted in the way shown in Fig. 3 the one behind the other. Ring 24 bears on ring 36 which latter has a passage 37, a bore 38 for cooperating with pin 39, and teeth 40.

When canals 37, 34, 34 and 35 are in line (in Fig. 3 only canal 37 and canal 34 of sleeve 22 being in line) the three teeth 18, 19 and 20 may pass through the series of members 36, 21, 22 and 23 without meeting with any impediment, tooth 18 having its movement limited in direction towards the exit end by the face 41. The whole of members 36, 24, 21, 25, 22, 26 and 23 are kept in place by nut 42 screwed into body 43 of the device, in which an upper window 44 permits reading the crowns 28 of the rings.

Pin 12 ends in a screw threaded tubular part 45 in which the insulating block 46 is screwed which carries the contact pin 47 by which two elastic contact elements 48 (one of which is shown in Fig. 3) are electrically connected.

Through contacts 48 and pin 47 the circuit of the electric installation of car, comprising igniting and eventually starting devices, is closed.

End 45 of pin 12 is slightly bevelled at 49 to favour insertion of pin 12 into the bore 50 provided in plate 4 so as to make disk 2 rigid with plates 3 and 4.

On the inclined conical surfaces 51 and 52 there is a crown of alphabetical letters of the same number as those of the above said crowns 3 and 4.

A spring 53 tends to shift the handle 13 outwards and consequently extract pin 12 from bore 50 in order to free disk 2 and unlock the steering wheel 1 from the steering rod.

My above described improved safety device is operated as follows:

In mounting the device for the first time, or when buying a new car with which the device is to be used,—sleeves 21, 22 and 23 are mounted within their rings 24, 25 and 26 so that their free passages 34 and 35 register with arbitrary letters selected on the various crowns 28, and therefore these six members are successively introduced into the tubular body 43 into which ring 36 has been previously introduced. The handle 13 is then given a determined angular position with respect to pin 12 by teeth 15 and screw 14 so that its crown 32 will show at the window 44 any preselected letter. As in the illustrated form canal 37 of member 36 is structurally provided on the side of window 44, the teeth 18, 19 and 20 will be freely movable only when at the window 44 the corresponding letters on crowns 28 and on crown 52 (and 51) will appear. After the whole of the said members has been closed by nut 42 bearing on projection 54 without any pressure on the assembled members being exercised, but preventing extraction of pin 12 (even after leaving unscrewed screw 14) by its face 55,—the whole assembly is mounted in place, as shown in Fig. 3.

At that moment pin 12 with handle 13 still are in the outermost position (not illustrated), and therefore disk 2 is loose with respect to plates 3 and 4, whilst contacts 48 do not close the electric circuit owing to the conductive member, namely pin 47, being in its retracted position.

When canals 37, 34, 34 and 35 are in line, the handle and its pin may be pushed into the position shown in Fig. 3, and even a little beyond, as long as tooth 20 does not abut on face 55 of nut 42. In this position the handle may be rotated any number of letters, and each passage from one letter to another will be signalled by a snap of ball 17 engaging with grooves 16. In this way the teeth of the pin will go out of alinement with the passing canals, and after release of the handle the latter, operated by spring 53, will be restored to its outer position, bearing on tooth 20 of blind teeth 57.

Furthermore rings 24 and 25 may be rotated by hand through a certain angle so as to make accidental return of pin 12 and therefore unlocking of wheel from steering rod practically impossible.

As to the thief-proof side of invention, a still more important point is the reverse operation by which, when the teeth of pin 12 are in their outermost position, they cannot return to the position shown in Fig. 3 except by alinement of the above said canals which, once destroyed by manual rotation of the various rings, cannot be found again by feeling, because the teeth would meet from time to time the false teeth 40, 56, 58 the function of which is to prevent feeling out the true position of the passing canals, by giving a like sensation of same.

It is understood that the above described modification is given as a purely illustrative, not limitative example, and various structural variations may be made to the parts without departing from the invention.

Having now particularly described and ascertained the nature of my said invention and in what manner the same is to be performed, I declare that what I claim is;

In a permutation lock, a cylindrical casing, two-part rings rotatably mounted in said casing and held against axial displacement therein, a rotatable and slidable bolt arranged within the rings and having terminal and lateral teeth at one end thereof, a handle member adjustably engaged with the terminal teeth of the bolt and having an angular portion overhanging said casing, a spring interposed between the casing and said handle member, means carried by the casing and coacting with the lateral teeth of the bolt to yieldably retain the latter in adjusted angular position, laterally projecting pins carried by said bolt, the parts of said rings being arranged one within the other and the inner parts having slots therein arranged to permit the passage of said pins therethrough when said rings are properly positioned, means coacting with the outer parts of said rings to yieldably retain the latter in adjusted angular position with respect to said casing, and means permitting relative adjustment of the inner and outer parts of each ring.

GIOVANNI BOLOGNINI.